United States Patent
Subramanian et al.

(10) Patent No.: US 10,541,934 B1
(45) Date of Patent: Jan. 21, 2020

(54) SYSTEMS AND METHODS FOR FRAME BUFFERING AND ARBITRATION IN A NETWORK

(71) Applicant: Xilinx, Inc., San Jose, CA (US)

(72) Inventors: Ramesh R. Subramanian, Hyderabad (IN); Ravinder Sharma, Hyderabad (IN); Ashish Banga, New Delhi (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/837,400

(22) Filed: Dec. 11, 2017

(51) Int. Cl.
  *H04L 12/863* (2013.01)
  *H04L 12/947* (2013.01)

(52) U.S. Cl.
  CPC .......... *H04L 47/6215* (2013.01); *H04L 49/25* (2013.01)

(58) Field of Classification Search
  CPC .......................... H04L 47/6215; H04L 49/25
  See application file for complete search history.

(56) References Cited

U.S. PATENT DOCUMENTS

| | | | | |
|---|---|---|---|---|
| 7,464,180 | B1* | 12/2008 | Jacobs | H04L 47/2441 370/395.42 |
| 2003/0219026 | A1* | 11/2003 | Sun | H04L 47/20 370/412 |
| 2005/0147114 | A1* | 7/2005 | Stewart | H04L 49/103 370/432 |
| 2008/0177508 | A1* | 7/2008 | Veith | G01R 13/0254 702/191 |
| 2013/0070584 | A1* | 3/2013 | Hutchison | G06F 11/3058 370/216 |
| 2013/0250954 | A1* | 9/2013 | Sano | H04L 45/06 370/392 |
| 2014/0022895 | A1* | 1/2014 | Matthews | H04L 47/12 370/230 |
| 2017/0075838 | A1* | 3/2017 | Nooney | G06F 13/37 |

OTHER PUBLICATIONS

Haddock, Stephen "Frame Metering in 802.1Q", Version 1, Jan. 15, 2013, 20 pages, http://www.ieee802.org/1/files/public/docs2013/new-tsn-haddock-flow-metering-in-Q-0113-v01.pdf.
Jochim, Markus , General Motors Research & Development, "Ingress Policing", IEEE 802.1 TSN Plenary, Nov. 10-15, 2013, 43 pages, Dallas, USA.
MEF Technical Specification MEF 103, Ethernet Services Attributes Phase 3, Oct. 2013, The MEF Forum 2013, 120 pgs.

\* cited by examiner

*Primary Examiner* — Kodzovi Acolatse
*Assistant Examiner* — Jay L Vogel
(74) *Attorney, Agent, or Firm* — David O'Brien; Hong Shi

(57) ABSTRACT

A network device includes a first port, a second port, a third port, and an arbitration circuit. The arbitration circuit is configured to receive a first frame and a second frame. The first frame is received from the first port and to be forwarded to the third port. The second frame is received from the second port and to be forwarded to the third port. The arbitration circuit compares a first priority of the first frame and a second priority of the second frame to generate a first comparison result. In response to the first comparison result, first forwarding data is generated based on the first and second frames. The first forwarding data is sent to an output of the arbitration circuit.

20 Claims, 13 Drawing Sheets

FIG. 10

| | Frame Size (bytes) | | | | Latency (nano seconds) | |
|---|---|---|---|---|---|---|
| | 206-I scheduled | 206-I Best Effort | 208-I Scheduled | 208-I Best Effort | Occupancy Based Arbitration only 1014 | Priority Based Multiplexing & Occupancy Based Arbitration 1016 |
| 1 | 64 | 2000 | 64 | 2000 | 651 - 17171 | 651 - 723 |
| 2 | 128 | 2000 | 128 | 2000 | 651 - 15995 | 651 - 723 |
| 3 | 256 | 2000 | 256 | 2000 | 651 - 15131 | 651 - 731 |
| 4 | 2000 | 2000 | 2000 | 2000 | 651 - 4747 | 651 - 715 |
| 5 | 64 to 256 | 64 to 2000 | 64 to 256 | 64 to 2000 | 651 - 18779 | 651 - 747 |
| 6 | 64 to 2000 | 64 to 2000 | 64 to 2000 | 64 to 2000 | 651 - 15219 | 651 - 739 |

Rows indicated by arrows: 1002, 1004, 1006, 1008, 1010, 1012. Table reference: 1000.

SYSTEMS AND METHODS FOR FRAME BUFFERING AND ARBITRATION IN A NETWORK

FIELD

Examples of the present disclosure generally relate to integrated circuits (ICs) and, in particular, to an embodiment related to system and methods for buffering and arbitrating frames using an IC in a network.

BACKGROUND

In a communication system, a switching device may receive frames (packets) containing data or control information on one port, and based on destination information contained within the frames, routes the frames out another port to the destination (or an intermediary destination). Many applications using the communication system, such as process control applications and machine control applications may have a large number of streams. Moreover, these applications may be latency critical to meeting control loop frequency requirements.

Accordingly, it would be desirable and useful to provide an improved way for frame buffering and arbitration in a network.

SUMMARY

In some embodiments in accordance with the present disclosure, a network device includes a first port, a second port, a third port, and an arbitration circuit. The arbitration circuit is configured to receive a first frame, wherein the first frame is received from the first port and to be forwarded to the third port; receive a second frame, wherein the second frame is received from the second port and to be forwarded to the third port; compare a first priority of the first frame and a second priority of the second frame to generate a first comparison result; in response to the first comparison result, generate first forwarding data based on the first and second frames; and send, to an output of the arbitration circuit, the first forwarding data.

In some embodiments, the arbitration circuit includes: a multiplexer circuit configured to: in response to the first comparison result that the first priority of the first frame is different from the second priority of the second frame, generate the first forwarding data by multiplexing the first frame and the second frame.

In some embodiments, the multiplexer circuit is configured to: generate the first forwarding data by multiplexing the first frame and the second frame based on a data beat period.

In some embodiments, the network device includes a first buffering system including: a first buffer configured to receive, from the first port, the first frame; and a second buffer configured to receive, from the second port, the second frame; wherein the arbitration circuit receives the first and second frames from the first buffering system.

In some embodiments, the arbitration circuit includes: an occupancy-based arbitration circuit configured to: in response to the first comparison result that the first priority of the first frame is the same as the second priority of the second frame, generate the first forwarding data based on a first occupancy of the first buffer and a second occupancy of the second buffer.

In some embodiments, to generate the first forwarding data based on the first and second occupancies, the occupancy-based arbitration circuit is configured to: determine that the first occupancy is greater than the second occupancy; and generate the first forwarding data based only on the first frame.

In some embodiments, the first buffer includes a cut through buffer.

In some embodiments, the first buffer is configured to: receive, from the first port, a third frame having a third priority different from the first priority.

In some embodiments, the network device includes a second buffering system configured to: receive, from the arbitration circuit, the first forwarding data; and forward, to the third port, second forwarding data including the first forwarding data.

In some embodiments, the second buffer includes a store and forward buffer.

In some embodiments, a method includes receiving a first frame, wherein the first frame is received from a first port of a network device including the first port, a second port, and a third port. The first frame is to be forwarded to the third port. The method further includes receiving a second frame, wherein the second frame is received from the second port and to be forwarded to the third port; comparing a first priority of the first frame and a second priority of the second frame to generate a first comparison result; in response to the first comparison result, generating first forwarding data based on the first and second frames; and forwarding the first forwarding data.

In some embodiments, the generating the first forwarding data based on the first and second frames includes: in response to the first comparison result that the first priority of the first frame is different from the second priority of the second frame, generating the first forwarding data by multiplexing the first frame and the second frame.

In some embodiments, the generating the first forwarding data includes: multiplexing the first frame and the second frame based on a data beat period.

In some embodiments, the method includes receiving, by a first buffer of a first buffering system from the first port, the first frame; receiving, by a second buffer of the first buffering system from the second port, the second frame; and providing, by the first buffering system to an arbitration circuit of the network device, the first and second frames.

In some embodiments, the method includes in response to the first comparison result that the first priority of the first frame is the same as the second priority of the second frame, generating the first forwarding data based on a first occupancy of the first buffer and a second occupancy of the second buffer.

In some embodiments, the generating the first forwarding data based on the first and second occupancies includes: determining that the first occupancy is greater than the second occupancy; and generating the first forwarding data based only on the first frame.

In some embodiments, the first buffer includes a cut through buffer.

In some embodiments, the method includes receiving, by the first buffer from the first port, a third frame having a third priority different from the first priority.

In some embodiments, the method includes receiving, by a second buffering system from the arbitration circuit, the first forwarding data; and forwarding, by the second buffering system to the third port, second forwarding data including the first forwarding data.

Other aspects and features will be evident from reading the following detailed description and accompanying drawings.

BRIEF DESCRIPTION OF THE DRAWINGS

FIG. 10 illustrates a table illustrating a comparison of latency measurements of various arbitration engines according to some embodiments of the present disclosure.

DETAILED DESCRIPTION

Figure 1:
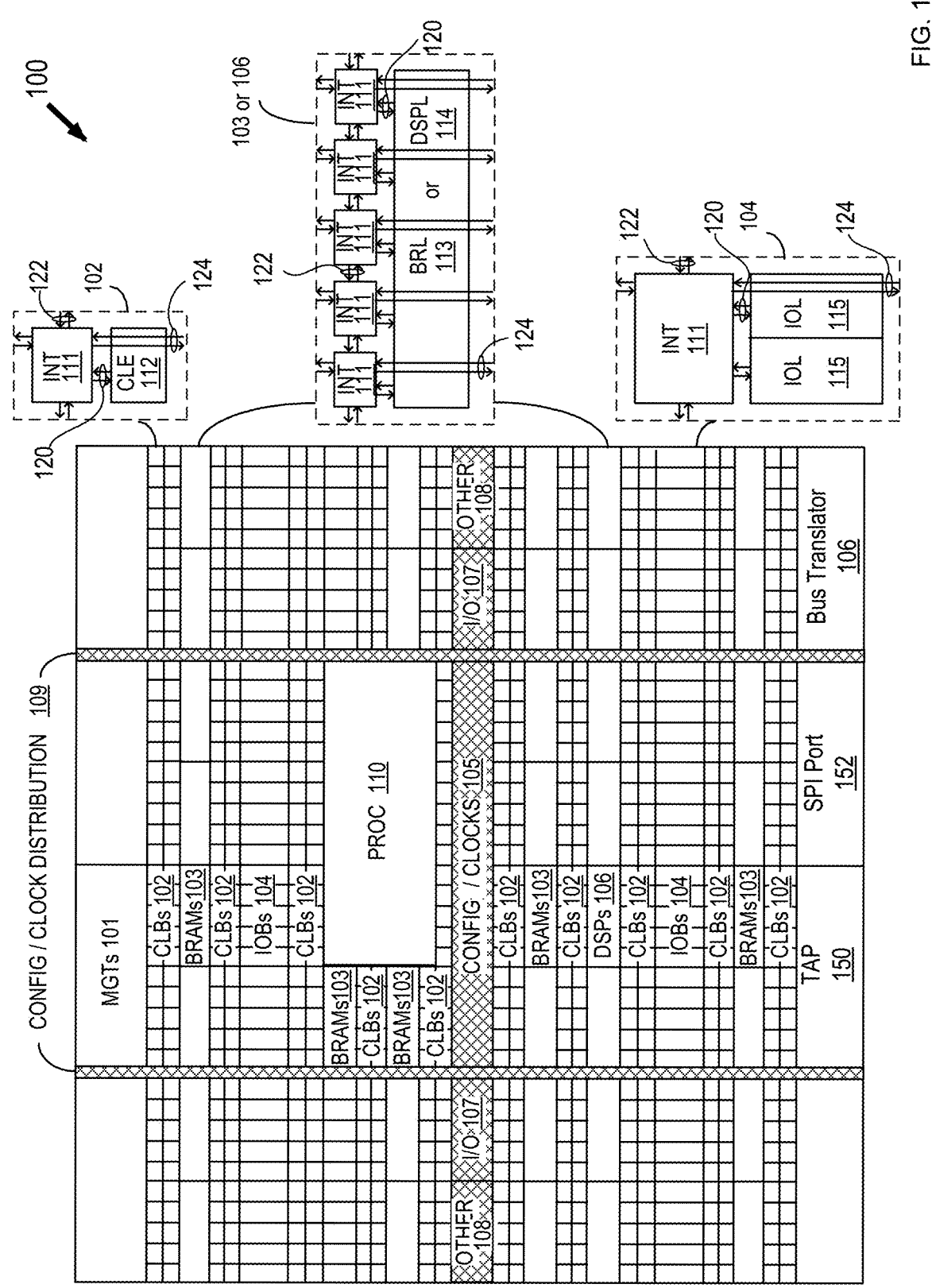
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. For real time communication of time sensitive streams (e.g., in industrial control applications, digital video and audio data) over the networks, network devices (e.g., switches, bridges, etc.) implement low latency, non-blocking, and highly deterministic frame forwarding mechanisms. To enable deterministic real-time communication over Ethernet, Time-Sensitive Networking (TSN) standards have been defined by the IEEE TSN task group. The TSN standards define mechanisms for the time-sensitive transmission of data over Ethernet networks. These time-sensitive Ethernet frames are typically pre-negotiated for path, identification mechanism, cycle time, bandwidth, fault tolerance and recovery mechanisms and are typically referred as TSN streams. The TSN standards define network components (e.g., switches, bridges) and endpoint components (e.g., talkers, listeners, etc.) to be part of time aware system solutions. Typical TSN solutions may include switches and endpoints as separate components. By using time synchronization, a schedule shared between network devices, and queues defined based on time, TSN provides a bounded maximum latency for scheduled traffic through switched networks. However, the non-blocking forwarding mechanisms in TSN switches may result in high buffering needs.

For integrated circuit (IC) solutions, it has been discovered that by using a priority-based multiplexing and occupancy-based arbitration method, lower latency and higher deterministic forwarding path for the critical high priority traffic may be achieved. Various advantages may be present in various applications of the present disclosure. No particular advantage is required for all embodiments, and different embodiments may offer different advantages. One of the advantages of some embodiments is that by providing an integrated solution of a switch and an endpoint, lower latency is achieved by eliminating latency of a network node to an internal endpoint. Another advantage of some embodiments is that by multiplexing both higher and lower priority frames at a finer granularity (e.g., based on frame fragments including one or more bytes) than the complete frames, the priority-based multiplexing not only reduces latency for higher priority frames, but also reduces buffering needs and latency for lower priority frames. Yet another advantage of some embodiments is that by using an arbitration method based on the occupancy of input buffers coupled to the input of the arbitration engine, it is ensured that no backpressure is generated from the input buffers. Yet another advantage of some embodiments is that by using output buffers coupled to the output of the arbitration engine, required backpressure if any (e.g., in priority flow control on a network port) may be achieved by configuring the output buffers. Yet another advantage of some embodiments is that such a priority-based multiplexing and occupancy-based arbitration method may be implemented with a larger number of priority queues and/or larger number of switch ports.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multigigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the data reordering is not limited to the exemplary IC depicted in FIG. 1, and that IC having other configurations, or other types of IC, may also implement the buffering and arbitration system.

Figure 2:
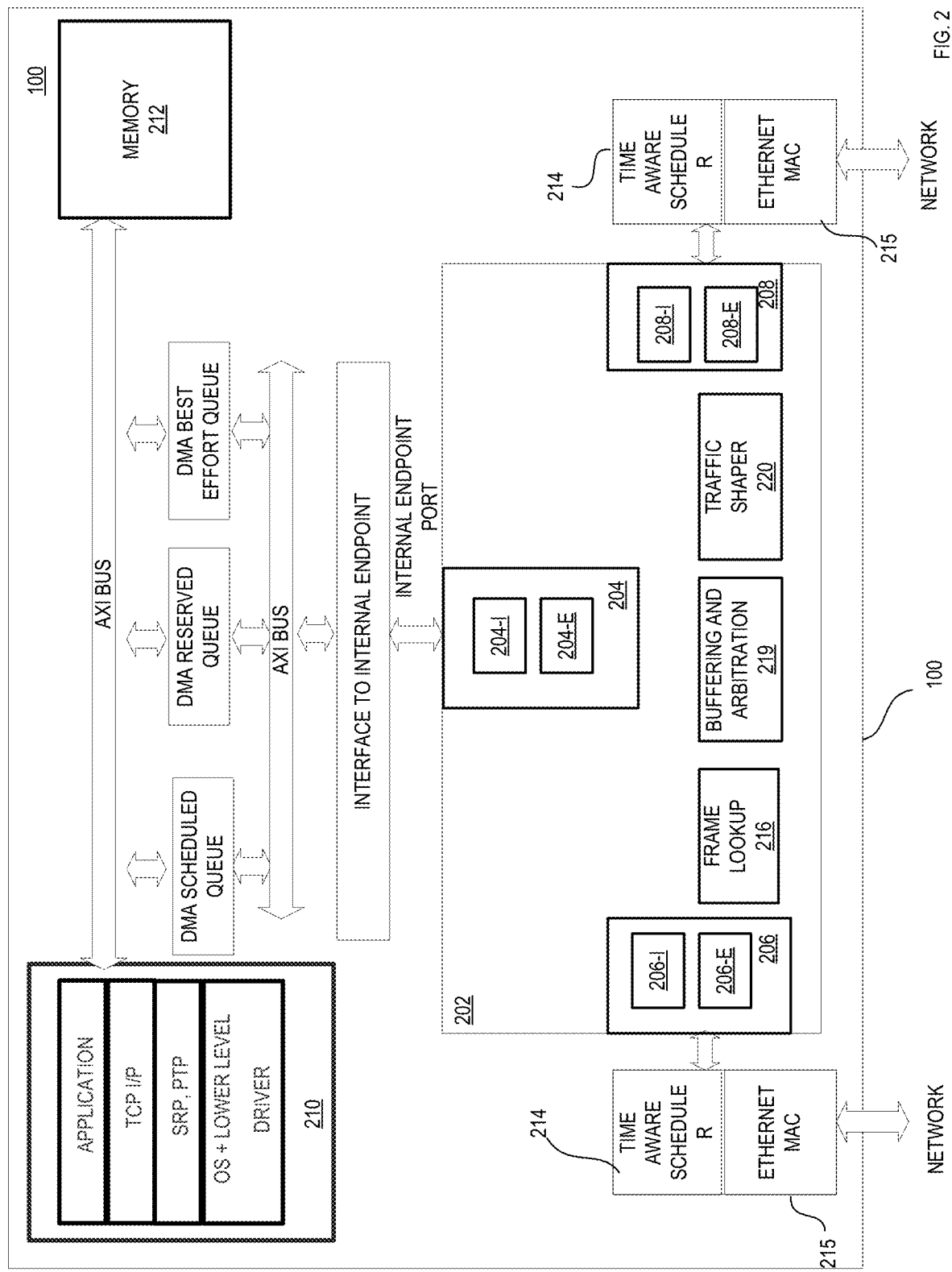
FIG. 2 is a block diagram illustrating an exemplary switch according to some embodiments of the present disclosure.

Referring to FIG. 2, illustrated is an IC 100 including a switch 202. The switch 202 includes three ports 204, 206, and 208. The port 204 connects to an endpoint (e.g., a processing unit 210 and/or a memory 212) in the IC 100 through internal buses. As such, the port 204 is also referred to as an internal endpoint port 204. The ports 206 and 208 are connected to an external network through a network interface (e.g., an Ethernet media access control (MAC) interface 215). As such, ports 206 and 208 are also referred to as network ports 206 and 208. Each of the ports 204, 206, and 208 includes an ingress port (e.g., ingress ports 204-I, 206-I, 208-I) and an egress port (e.g., 204-E, 206-E, and 208-E).

In some embodiments, the switch 202 supports queues having different priorities (e.g., a scheduled priority, a reserved priority, a best effort priority). For example, a scheduled queue (e.g., including control data) may have a scheduled priority, which indicates that the frames in the scheduled queue are time critical, and have a priority higher than other priorities. For further example, a reserved queue (e.g., including audio/video data) may have a reserved priority, indicating that the frames in the reserved queue are also time critical, but have a lower priority than the scheduled priority. For further example, a best effort queue may have a best effort priority, which indicates that the frames in that best effort queue are not time critical, and have a lower priority than the reserved priority.

In the example of FIG. 2, the switch 202 includes a frame lookup unit 216, a buffering and arbitration system 219, and a traffic shaper 220. The frame lookup unit 216 may look up values and actions associated with a particular frame. The buffering and arbitration system 219 may make forwarding decisions for streams from different ingress ports. The traffic shaper 220 may perform queuing functions and transmission functions, and forward the selected frames to the corresponding egress ports.

As illustrated in FIG. 2, time aware schedulers 214 are implemented on egress paths of the switch 202. The egress paths may include an egress path using the egress port 206-E, and an egress path using the egress port 208-E. The time aware schedulers 214 may block the non-scheduled queues, so that the corresponding port is idle when the scheduled queue is scheduled for transmission. While in the example of FIG. 2, an egress path including an egress port 204-E of the internal endpoint port 204 does not include a time aware scheduler 214, in other examples, the egress path including an egress port 204-E may also include a time aware scheduler 214.

Figure 3:
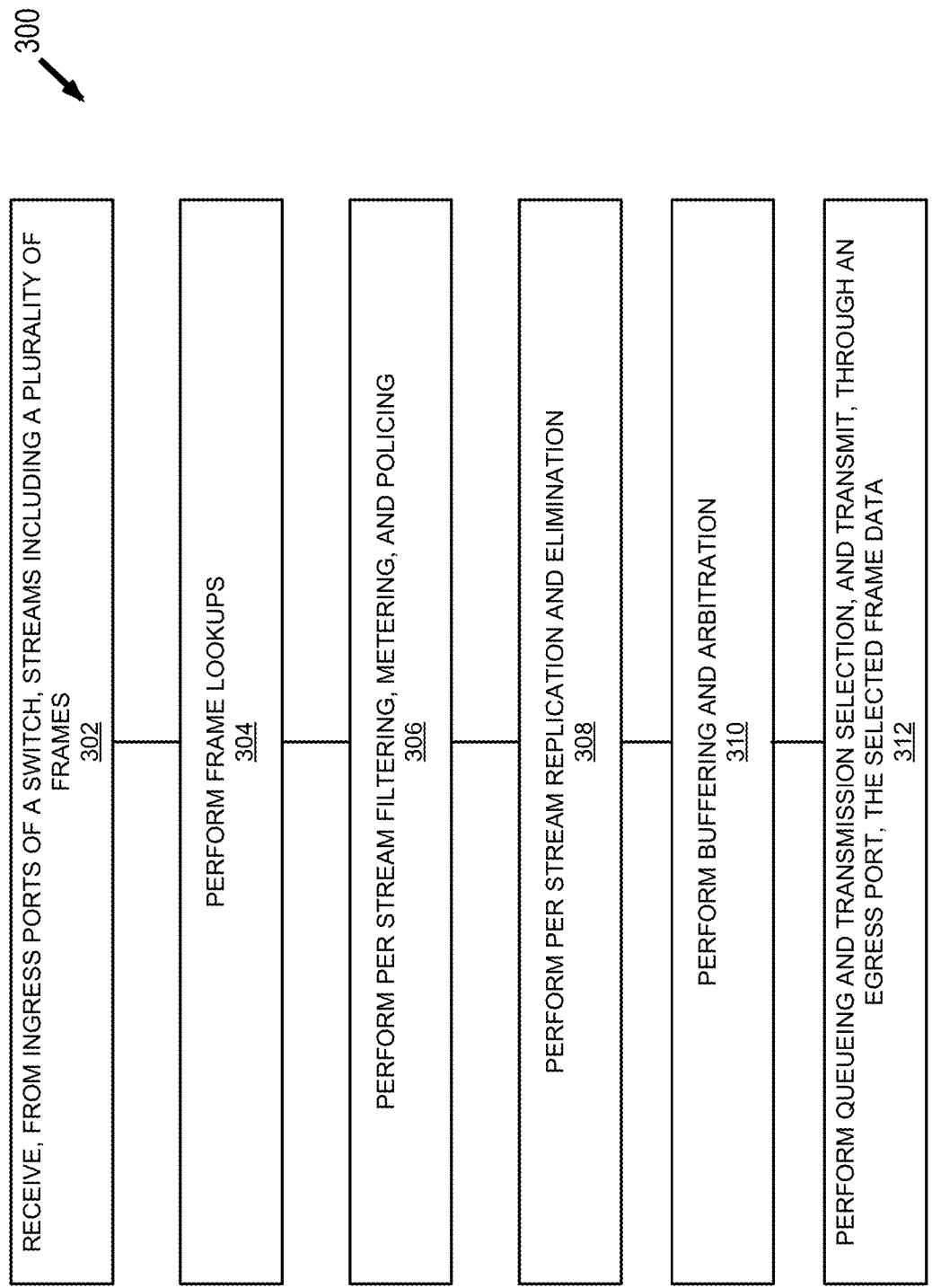
FIG. 3 is a flow diagram illustrating a method for forwarding frames by a switch according to some embodiments of the present disclosure.

Referring to FIG. 3, illustrated thereof is a method 300 of forwarding frames by a switch (e.g., a switch 202 of FIG. 2). The method 300 begins at block 302, where a switch receives, from an ingress port (reception port) of the switch, a frame (e.g., as part of high priority TSN stream/Audio Video Bridging (AVB) stream, or low priority best effort traffic). For example, at block 302, one or more ingress ports (e.g., ingress ports 204-I, 206-I, and 208-I) of the switch 202 of FIG. 2 receive Ethernet frame which can get classified as part of high priority TSN stream/AVB stream, or low priority best effort traffic.

The method 300 may then proceed to block 304, where the switch performs a frame lookup process to determine various lookup values associated with the frames. For example, a frame lookup unit 216 of a switch 202 of FIG. 2 performs a frame lookup process to the received frames to determine egress ports, egress priority queue, translations, actions, etc.) associated with the frames.

Figure 4:
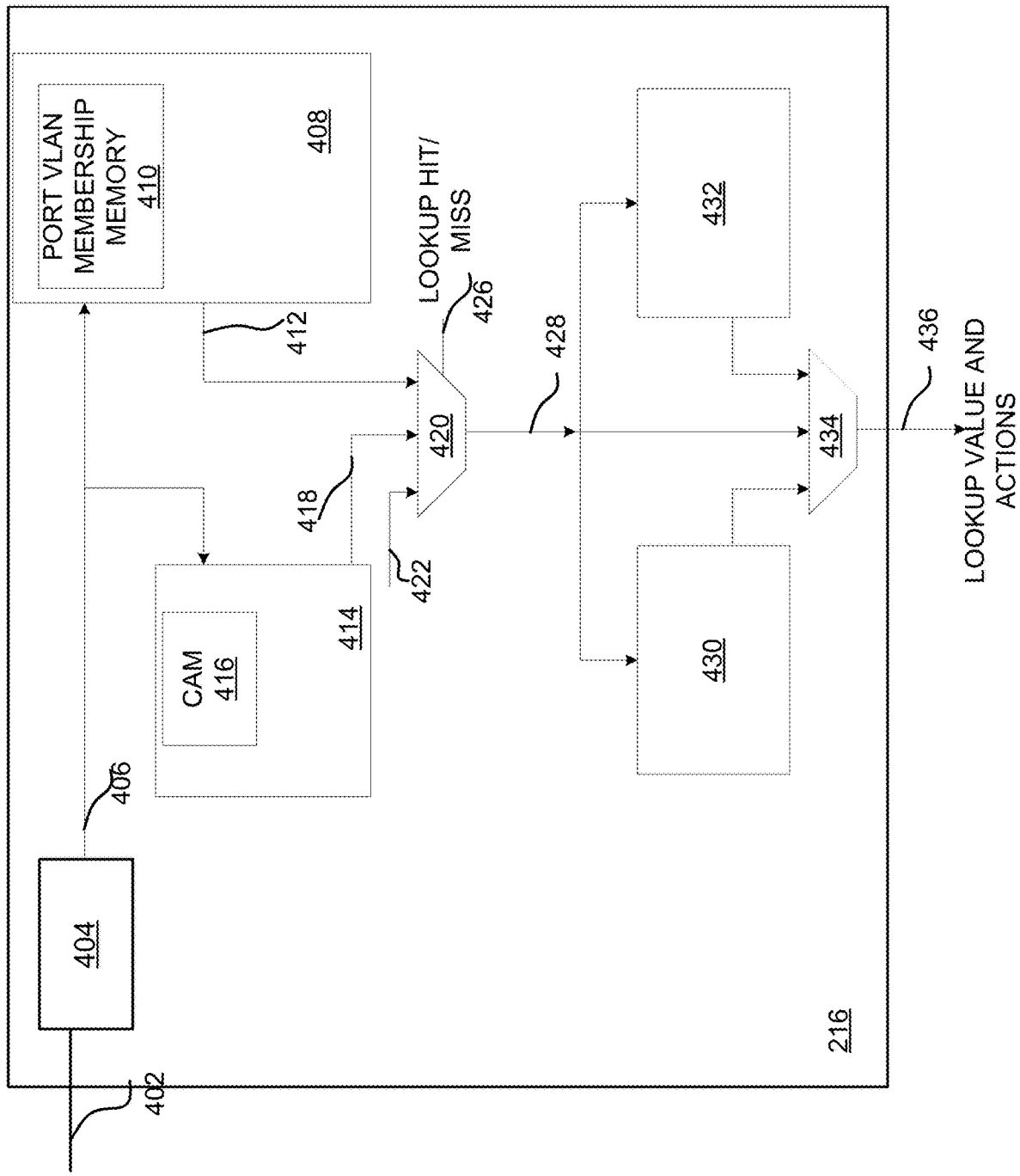
FIG. 4 is a block diagram illustrating lookup levels provided in a switch according to some embodiments of the present disclosure.

Referring to FIG. 4, at block 304, the frame lookup unit 216 receives a frame 402 of an incoming stream, and sends the frame 402 to a parsing unit 404. The parsing unit 404 may parse the header fields (e.g., destination MAC address, VLAN identifier (ID), priority fields) of the frame 402, and output the parsed frame information 406 including for example, the destination MAC address, VLAN ID, and priority associated with the frame 402.

In the example of FIG. 4, the frame lookup unit 216 may perform the frame lookup process using multiple memories (e.g., a port VLAN membership memory 410 and a content addressable memory (CAM) 416). For example, the frame lookup unit 216 includes a VLAN membership lookup unit 408, which looks up VLAN member ports using a port VLAN membership memory 410 based on the parsed frame information 406 (e.g., by using the VLAN ID of the parsed frame information 406). The VLAN membership lookup unit 408 may then output the VLAN member ports 412 associated with the frame 402.

In some embodiments, the CAM lookup unit 414 looks up a set of actions associated with the frame 402 using a CAM 416 based on the parsed frame information 406 (e.g., a destination MAC address, VLAN ID, and/or a combination thereof). The actions may include an address translation action, a tagging/un-tagging action, and any other suitable actions. The CAM lookup unit 414 then provides a CAM output 418, which may include actions associated with the frame 402.

As shown in FIG. 4, the frame lookup unit 216 may include an output unit 420 receiving the VLAN member ports 412 from the VLAN membership lookup unit 408, receiving the CAM output 418 from the CAM lookup unit 414, and receiving switch control settings 422 (e.g., from a storage element of the switch 202). In an example, the output unit 420 may process the received VLAN member ports 412, CAM output 418, and switch control settings 422, and provide a frame lookup output 428 based on a lookup hit/miss signal 426. In an example, for each frame, the frame lookup output 428 may include an ingress port ID, VLAN member ports 412, actions, gate ID, and/or a combination thereof.

In some embodiments, additional lookups are performed for per stream traffic policer lookup unit 430 and per stream redundancy protocol lookup unit 432. For example, the per stream traffic policer lookup unit 430 receives the frame lookup output 428, and retrieves a per stream traffic policer configuration based on the frame lookup output 428. For further example, the per stream redundancy protocol lookup unit 432 may receive the frame lookup output 428, and provide a per stream redundancy protocol based on the frame lookup output 428. A lookup output unit 434 may receive the frame lookup output 428, per stream traffic policer configurations, and per stream redundancy protocol, and provide an output signal 436 including various lookup values and actions.

The method 300 may then proceed to block 306, where the switch performs filtering, metering, and policing on a per stream basis.

The method 300 may then proceed to block 308, where the switch performs per-stream replication and elimination (e.g., in accordance to IEEE 802.1CB). The switch may perform a per stream frame replication and elimination function to avoid frame loss due to equipment failure. For example, the packets of a particular frame may be replicated and then be sent on two or more disjoint paths. The frame elimination function may then be performed to combine and delete extra packets.

The method 300 may then proceed to block 310, where a buffering and arbitration system 219 may perform buffering and arbitration for streams received from different ingress ports, where those streams are to be forwarded to the same egress port.

Figure 5:
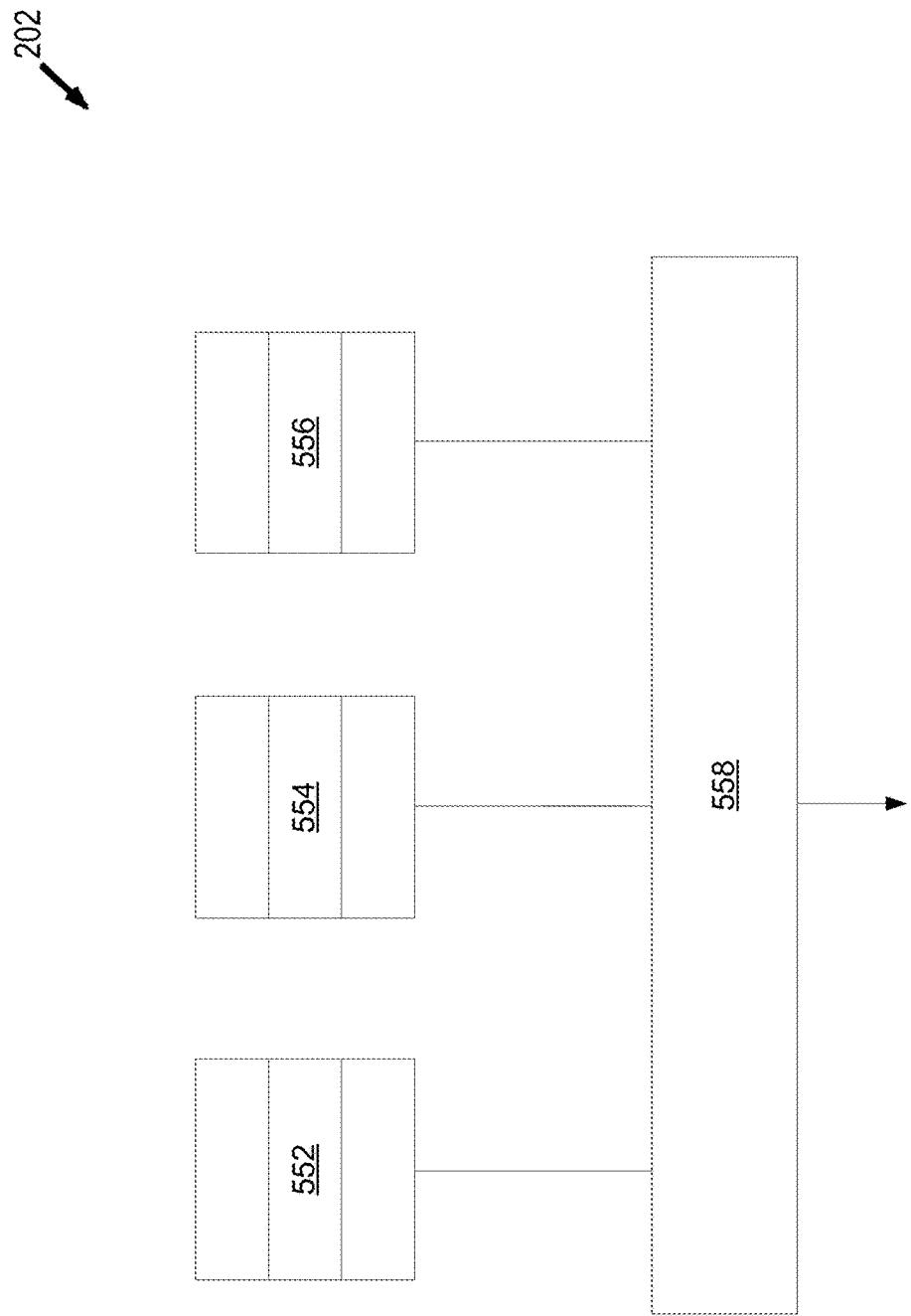
FIG. 5 is a block diagram illustrating queuing functions of a switch according to some embodiments of the present disclosure

The method 300 may then proceed to block 312, where a traffic shaper 220 of the switch 202 may perform queuing and transmission selection according to the priority and marking of the frames, and transmit the selected frame through a corresponding egress port of the switch 202. Referring to FIG. 5, at block 312, a frame may be sent to different queues based on its priority, marking, and/or associated gate ID. For example, a frame with a scheduled priority is sent to a scheduled traffic queue 552. In another example, a frame with a reserved priority is sent to a reserved traffic queue 554. In yet another example, a frame with a best effort priority is sent to a best effort traffic queue 556. A transmission selection unit 558 may select a frame from the queues and transmit that selected frame through a corresponding egress port of the switch 202.

Referring to FIGS. 6, 7A, 7B, 7C, 8A, 8B, 9, and 10, a buffering and arbitration system (e.g., the buffering and arbitration system 219 of FIG. 2) is described. The buffering and arbitration system may include multiple buffering systems for different functions. For example, an ingress buffering system including buffers 608, 610, and 612 may compensate for frame header parsing and lookup latencies. For further example, an input buffering system 705 coupled to inputs of the arbitration engine 706 may be used to absorb backpressure for the arbitration engine 706, and an output buffering system 707 coupled to outputs of the arbitration engine 706 may be used to achieve required backpressure if any.

Figure 6:
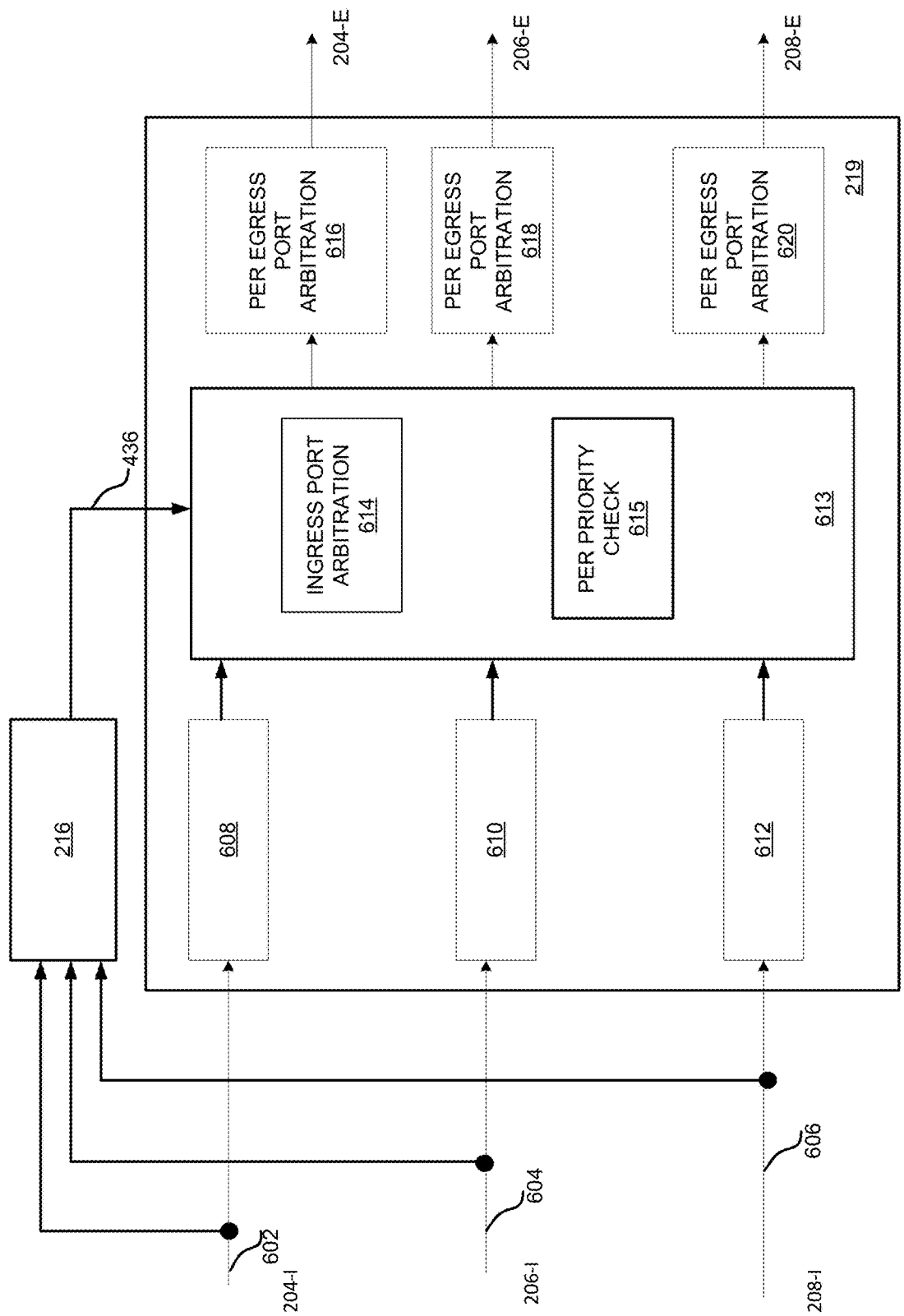
FIG. 6 is a block diagram illustrating a buffering and arbitration system according to some embodiments of the present disclosure.

Referring to FIG. 6, the buffering and arbitration system 219 receives streams 602, 604, and 606 from ingress ports 204-I, 206-I, and 208-I respectively. The streams 602, 604, and 606 are sent to buffers 608, 610, and 612 of an ingress buffering system respectively. In some embodiments, each of the buffers 608, 610, and 612 includes a cut through first-in, first-out (FIFO) buffer. These buffers 608, 610, and 612 provide low latency cut through data buffering to compensate for frame header parsing (e.g., by the parsing unit 404 of FIG. 4) and lookup latencies (e.g., of the frame lookup unit 216). Based on the header parsing and lookup decisions 436, an arbiter 614 of a forwarding unit 613 may perform per ingress port arbitration, and forward the frames to one or more egress port. In some embodiments, a per priority checker 615 of the forwarding unit 613 may make per priority decisions (e.g., determining the maximum frame size for each priority queue, performing traffic policing for the priority queue or stream) in parallel to the forwarding performed by the arbiter 614. The forwarding unit 613 may send the frames to the per egress port arbiters 616, 618, and 620 corresponding to egress ports 204-E, 206-E, and 208-E respectively. Specifically, frames that are received from the ingress ports 206-I and 208-I and to be forwarded to the egress port 204-E are forwarded to the per egress port arbiter 616. Frames that are received from the ingress ports 204-I and 208-I and to be forwarded to the egress port 206-E are forwarded to the per egress port arbiter 618. Frames that are received from the ingress ports 204-I and 206-I and to be forwarded to the egress port 208-E are forwarded to the per egress port arbiter 620.

Figure 7A:
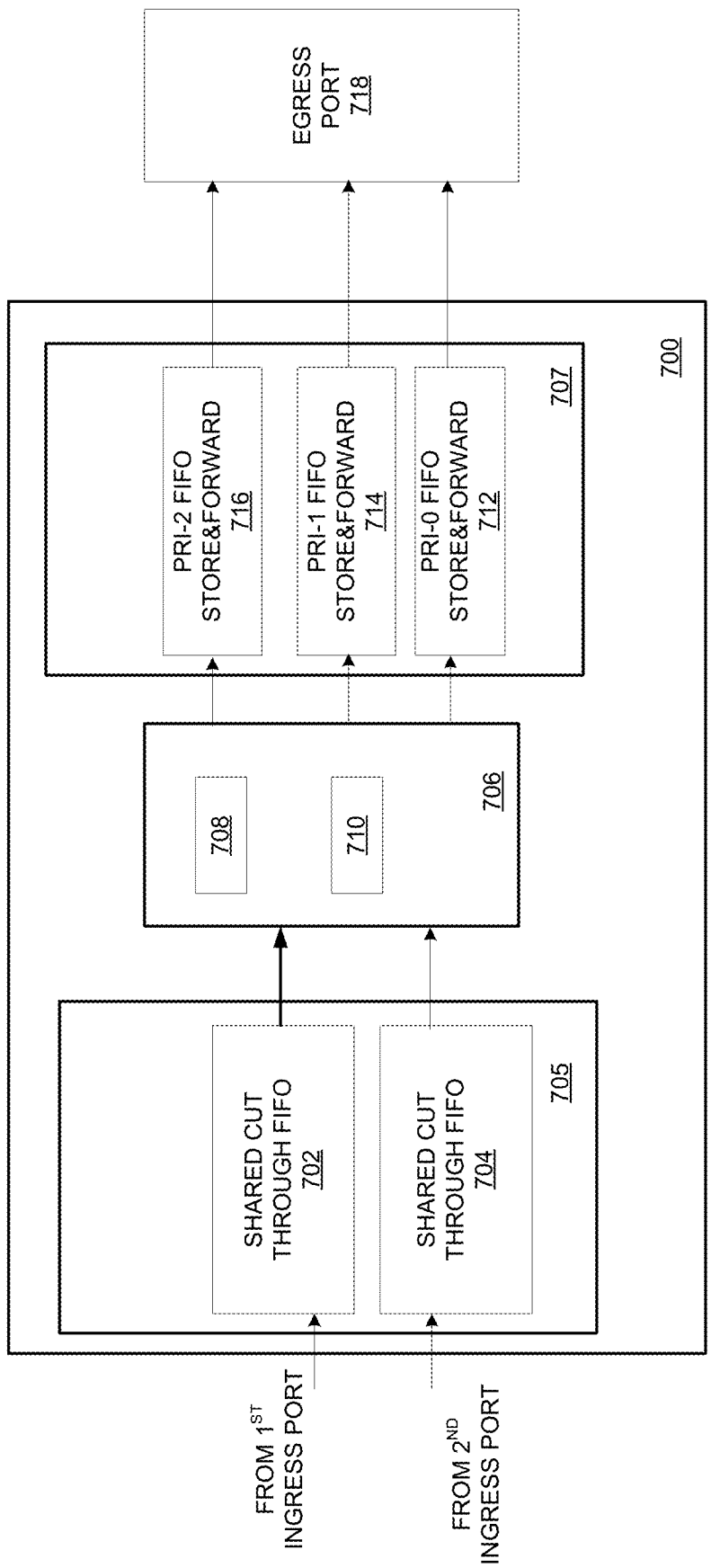
FIG. 7A is a block diagram illustrating a portion of the buffering and arbitration system according to some embodiments of the present disclosure.
Figure 7B:
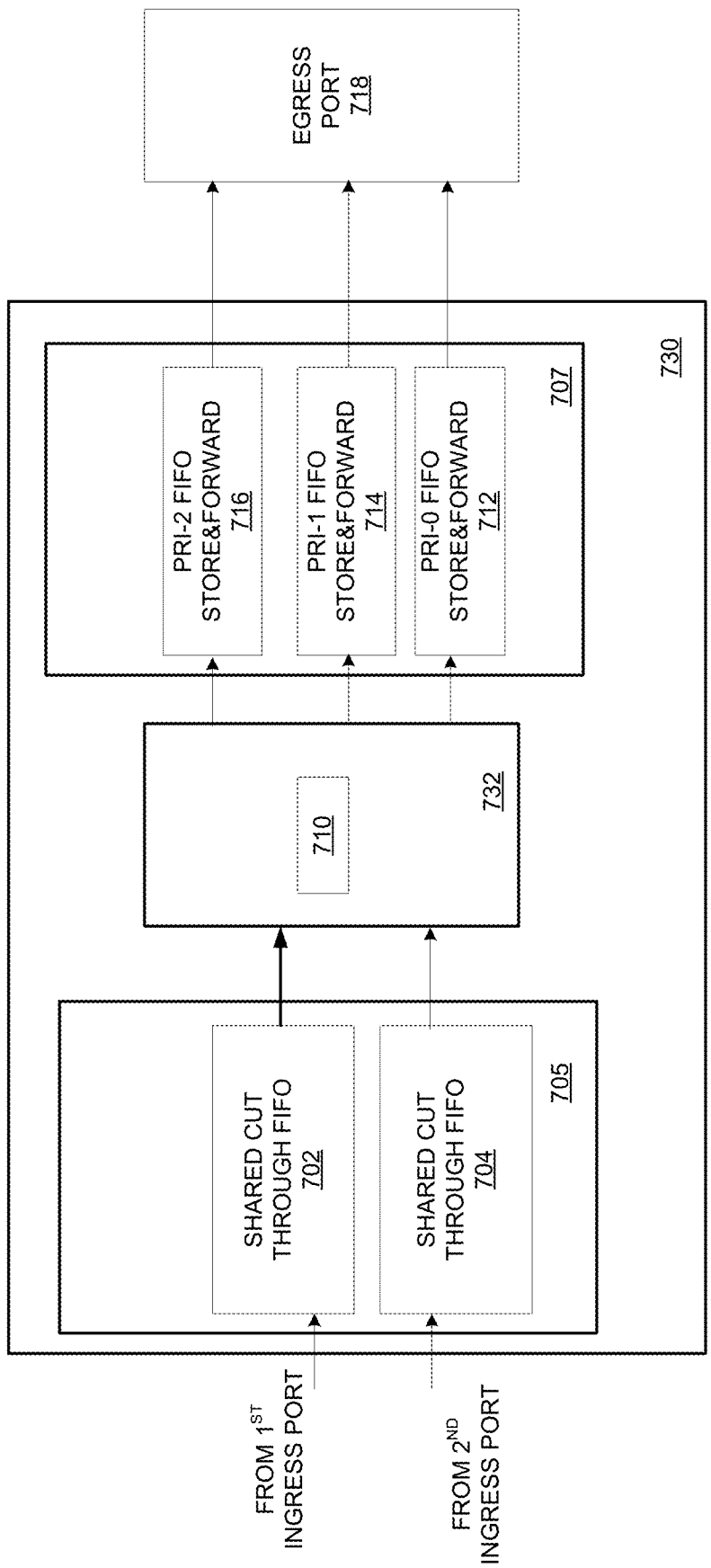
FIG. 7B is a block diagram illustrating a portion of the buffering and arbitration system according to some embodiments of the present disclosure.
Figure 7C:
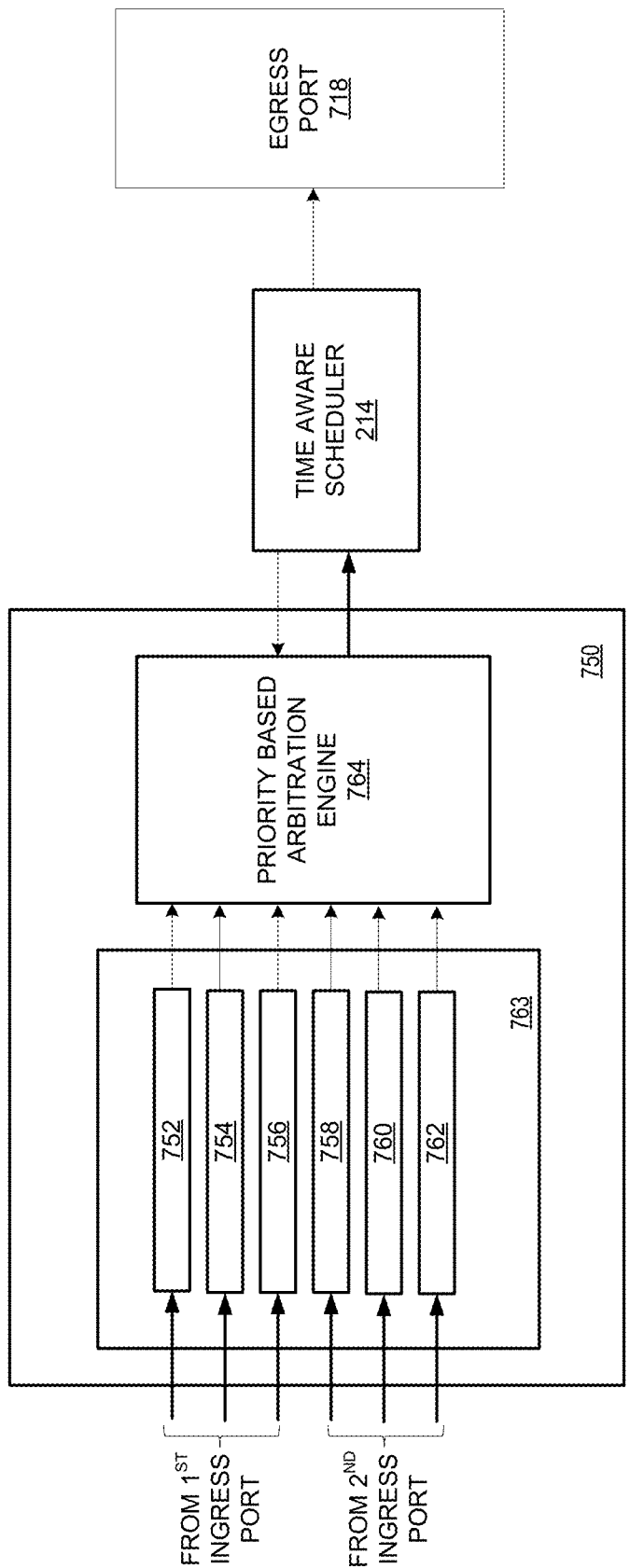
FIG. 7C is a block diagram illustrating a portion of the buffering and arbitration system according to some embodiments of the present disclosure.

Referring to FIGS. 7A, 7B, and 7C, various example per egress port arbiters (e.g., per egress port arbiters 616, 618, and 620 of FIG. 6) are described. The example of FIG. 7A illustrates a per egress port arbiter that includes an arbitration engine with both priority-based multiplexing and occupancy-based arbitration. The example of FIG. 7B illustrates a per egress port arbiter that includes an arbitration engine with occupancy-based arbitration but not priority-based multiplexing. The example of FIG. 7C illustrates a per egress port arbiter that includes an arbitration engine with priority based arbitration, where the per egress port arbiter is used together with a time aware scheduler. Each of the per egress port arbiters 616, 618, and 620 of FIG. 6 may be implemented using any of the per egress port arbiters 700, 730, and 750.

In the example of FIG. 7A, a per egress port arbiter 700 includes an input buffering system 705 (also referred to as a first stage buffering system 705), an arbitration engine 706, and an output buffering system 707 (also referred to as a second stage buffering system 707). The per egress port arbiter 700 uses a forwarding mechanism that minimizes latency, and provides better timing accuracy for higher priority control streams without using a time aware scheduler, thus avoiding a time aware scheduler to a switch port which is terminating to an internal end function. For example, by using both the first stage buffering system 705 (e.g., implementing per ingress port cut through buffering) and second stage buffering system 707 (e.g., implementing per priority store and forward buffering), the arbitration backpressure is absorbed. For further example, the arbitration engine 706 includes a multiplexer 708 for priority-based multiplexing and an occupancy-based arbiter 710 for performing occupancy based arbitration based on occupancies of the buffers 702 and 704 of the input buffering system 705.

As shown in the example of FIG. 7A, the input buffering system 705 includes buffers 702 and 704 for receiving frames to be forwarded to the same egress port 718. Each of the buffers 702 and 704 may be a cut-through FIFO, which may start forwarding a frame (or packet) before the whole frame has been received. Each of the buffers 702 and 704 may include frames of different priorities from the same ingress port. The buffer 702 may store frames of different priorities received from a first ingress port of the switch 202, and the buffer 704 may store frames of different priorities received from a second ingress port of the switch 202. In an example, the buffers 702 and 704 store frames received from the ingress ports 206-I and 208-I respectively, and those frames are to be forwarded to the egress port 204-E. In another example, the buffers 702 and 704 store frames received from the ingress ports 204-I and 208-I respectively, where those frames are to be forwarded to the egress port 206-E. In yet another example, the buffers 702 and 704 store frames received from the ingress ports 204-I and 206-I respectively, where those frames are to be forwarded to the egress port 208-E.

In some embodiments, the buffering of the input buffering system 705 is minimalistic. The input buffering system 705 may be used to absorb backpressure of the arbitration engine 706. In some embodiments, each of the buffers 702 and 704 is shared by frame data of all priorities. For example, the buffer 702 may be used to store frame data of all priorities (e.g., scheduled, reserved, and best effort) from the first ingress port, and the buffer 704 may be used to store frame data of all priorities (e.g., scheduled, reserved, and best effort) from the second ingress port. The frame data stored in the buffers 702 and 704 may include the corresponding priority information of the frames.

The per egress port arbiter 700 includes an arbitration engine 706, which may perform arbitration of the buffered frames from buffers 702 and 704 based on data availability on any or a combination of those buffers 702 and 704. In some embodiments, the arbitration is performed based on a per data beat basis instead of a per frame basis. A data beat is a transfer at a per clock cycle interval instead of a per frame interval. The granularity of the data beat may be one or more bytes or an internal data width granularity.

In the example of FIG. 7A, an arbitration engine 706 monitors buffers 702 and 704 of the input buffering system 705, and makes the forwarding decision to the frames received from the input buffering system 705. The arbitration engine 706 may include a priority-based multiplexer 708 and an occupancy-based arbiter 710 to perform the arbitration, which will be described in datable below. The arbitration engine 706 may then output per priority arbitrated frame data.

In the example of FIG. 7A, the second stage buffering system 707 includes buffers 712, 714, and 716. Each of the buffers 712, 714, and 716 may be a per priority FIFO store and forward buffer, which may start to forward a frame after the entire frame is received. In the example of FIG. 7A, the buffers 712, 714, and 716 are associated with different priorities respectively. For example, the arbitration engine 706 sends arbitrated frame data having a best effort priority (e.g., a priority with a value of "0") to the buffer 712. Those frame data may correspond to the lowest priority best effort traffic. For further example, the arbitration engine 706 sends arbitrated frame data having a reserved priority (e.g., a priority with a value of "1") to the buffer 714. These frame data may correspond to reserved streams (e.g., for audio/video data). For further example, the arbitration engine 706 sends arbitrated frame data having a scheduled priority (e.g., a priority with a value of "2") to the buffer 714. These frame data may correspond to the highest priority scheduled frames (e.g., for industrial control data). The second stage buffering system 707 may then forward the frames to the egress port 718.

Referring to FIG. 7B, a per egress port arbiter 730 is substantially the same as the per egress port arbiter 700 of FIG. 7A except the differences described below. The arbitration engine 732 of the per egress port arbiter 730 includes an occupancy-based arbiter 710 for occupancy-based arbitration, and does not perform priority-based multiplexing. The occupancy-based arbiter 710 may perform occupancy-based arbitration based on the occupancies of the buffers 702 and 704 without determining whether the first frame from the buffer 702 and the second frame from the buffer 704 have the same priority. In an example, the occupancy-based arbiter 710 may determine that the buffer 702 has a greater occupancy than the buffer 704, and in response, start to forward the data of the first frame from the buffer 702. In that example, the occupancy-based arbiter 710 may continue to forward the data of the first frame until the entire first frame is forwarded, regardless of whether the occupancy-based arbiter 710 receives another frame of a different priority from another ingress port.

Referring to FIG. 7C, in some embodiments, a per egress port arbiter 750 includes an input buffering system 763 that implements per ingress port, per priority buffering and an arbitration engine 764. In the example of FIG. 7C, instead of using an output buffering system, the priority-based arbitration engine 764 forwards the frame data to a time aware scheduler 214.

In some embodiments, the input buffering system 763 includes buffers 752, 754, 756, 758, 760, and 762, where each buffer receives frames of a particular priority from a particular ingress port. For example, buffers 752, 754, and 756 receive frames from a first ingress port (e.g., ingress port 204-I) of different priorities (e.g., best effort, reserved, scheduled) respectively. For further example, buffers 758, 760, and 762 receive frames from a second ingress port (e.g., ingress port 206-I) of different priorities (e.g., best effort, reserved, scheduled) respectively. As such, the per egress port arbiter 750 may provide a non-blocking minimum latency forwarding path to the egress port 718. Such a per ingress port, per priority buffering system 763 may have higher buffering needs than the input buffering system 705 of FIG. 7A, where a buffer of the input buffering system 705 may be shared by frames of different priorities.

In some embodiments, the arbitration engine 764 implements priority based arbitration, which makes the forward decisions based on the priorities of the frames. In an example, the arbitration engine 764 simply forwards the frame that has a higher priority without performing any multiplexing. In another example, the arbitration engine 764 does not make the forward decision based on the occupancies of the buffers of the input buffering system 763.

In some embodiments, the arbitration engine 764 forwards frames to a time aware scheduler 214, which may then forward the received frames based on time aware scheduler decisions. Such time aware decisions may be made on a per frame basis. In some examples, the time aware scheduler is an IEEE 802.1Qbv time aware scheduler. In those examples, a lower priority frame is not sent when a higher priority frame is scheduled for transmission by using a guard band mechanism, which may result in network bandwidth performance loss.

In various embodiments, each of the per egress port arbiters 616, 618, and 620 may include any of the arbiters 700 of FIG. 7A, 730 of FIG. 7B, and 750 of FIG. 7C. In an example, each of the per egress port arbiters 616, 618, and 620 includes the arbiter 700 of FIG. 7A. In another example, each of the per egress port arbiters 616, 618, and 620 includes the arbiter 730 of FIG. 7B. In yet another example, each of the per egress port arbiters 616, 618, and 620 includes the arbiter 750 of FIG. 7C. In yet another example, one or more of the per egress port arbiters 616, 618, and 620 include the arbiter 700 of FIG. 7A, while the other per egress port arbiters include the arbiter 750 of FIG. 7C.

In some embodiments, the per egress port arbiters 616, 618, and 620 may be determined based on whether the egress port is an internal endpoint egress port (e.g., egress port 204-E) or a network egress port (e.g., egress port 206-E or 208-E). In a particular example, the arbiter 616 for the internal endpoint egress port 204-E includes the arbiter 700 of FIG. 7A, while each of the arbiters 618 and 620 for the network egress ports 206-E and 208-E includes the arbiter 750 of FIG. 7B. In that particular example where the arbiter 616 for the internal endpoint egress port 204-E includes the arbiter 700 of FIG. 7A, the frames forwarded to the internal endpoint egress port 204-E are at a higher bandwidth than those received from the network ingress port 206-I or network ingress port 208-I. In that particular example, the bandwidth to the internal endpoint egress port 204-E is equal to or greater than the combined minimum ingress port rate of the network ingress ports 206-I and 208-I. For example, when each of the ingress rates of the network ingress ports 206-I and 208-I is at 1 Gbps, the frames forwarded to the internal endpoint egress port 204-E has a minimum 2 Gbps rate. Such a faster drain rate for the internal endpoint egress port 204-E and the input buffering system 705 both ensure that no backpressure is generated on the network ingress ports 206-I and 208-I due to arbitration between the two network ingress ports 206-I and 208-I. In that particular example, since the data is provided directly to an endpoint (e.g., a listener, an internal DDR memory), the drain rate from the input buffering system 705 and the subsequent buffering and forwarding are maintained at a higher rate.

Figure 8A:
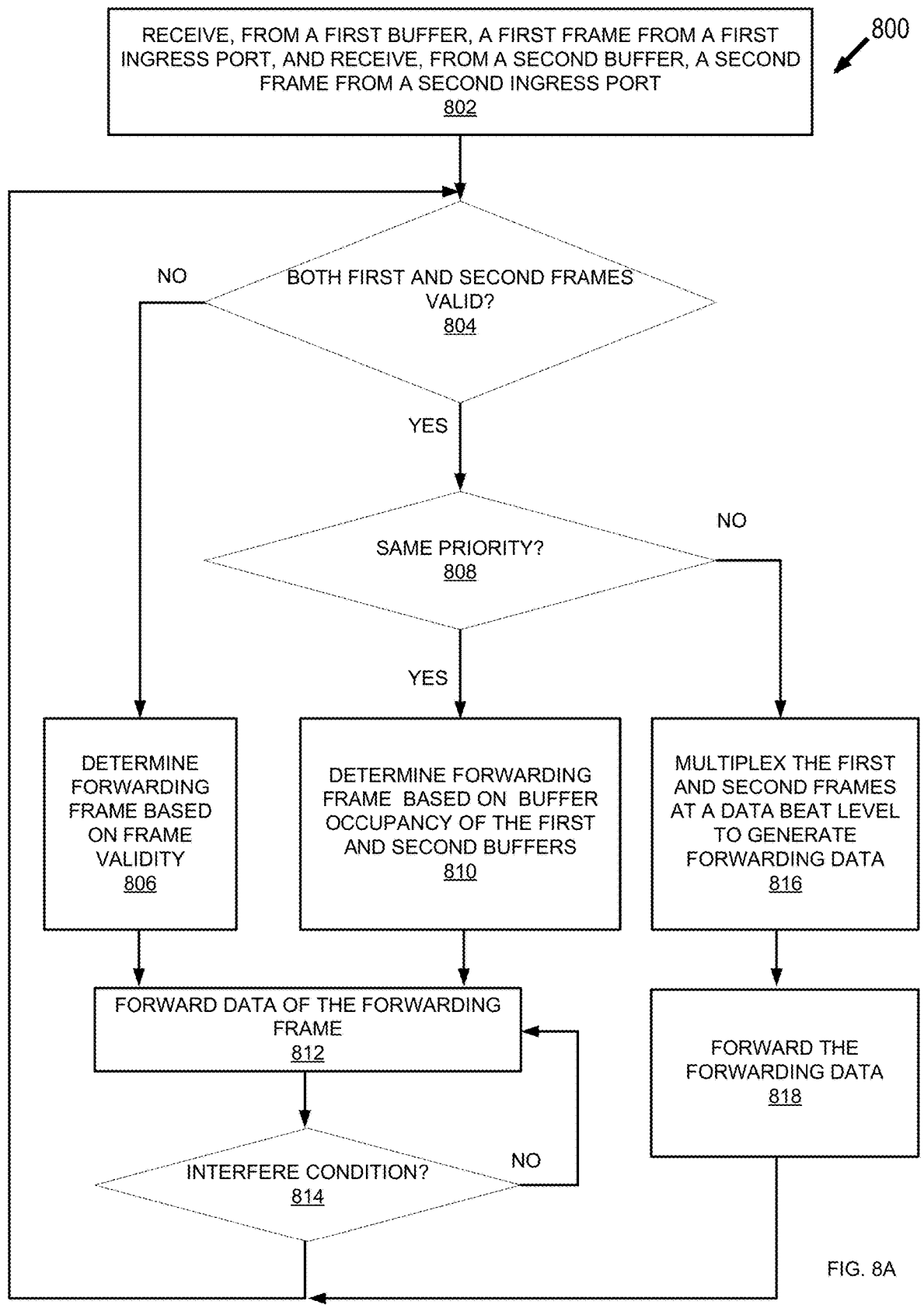
FIG. 8A is a flow chart illustrating a method for frame buffering and arbitration according to some embodiments of the present disclosure.
Figure 8B:
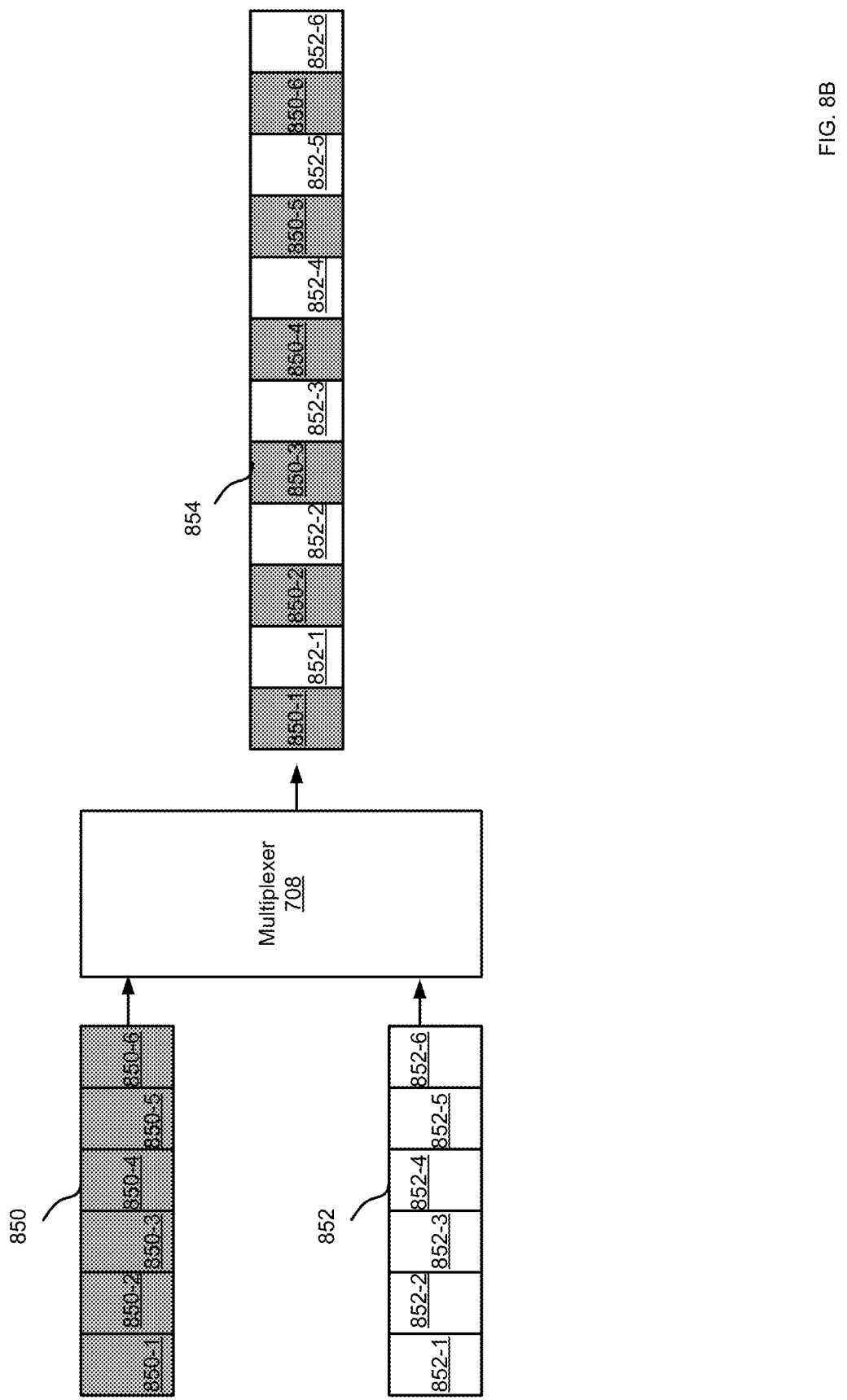
FIG. 8B is a block diagram illustrating a multiplexer for frame buffering and arbitration according to some embodiments of the present disclosure.
Figure 9:
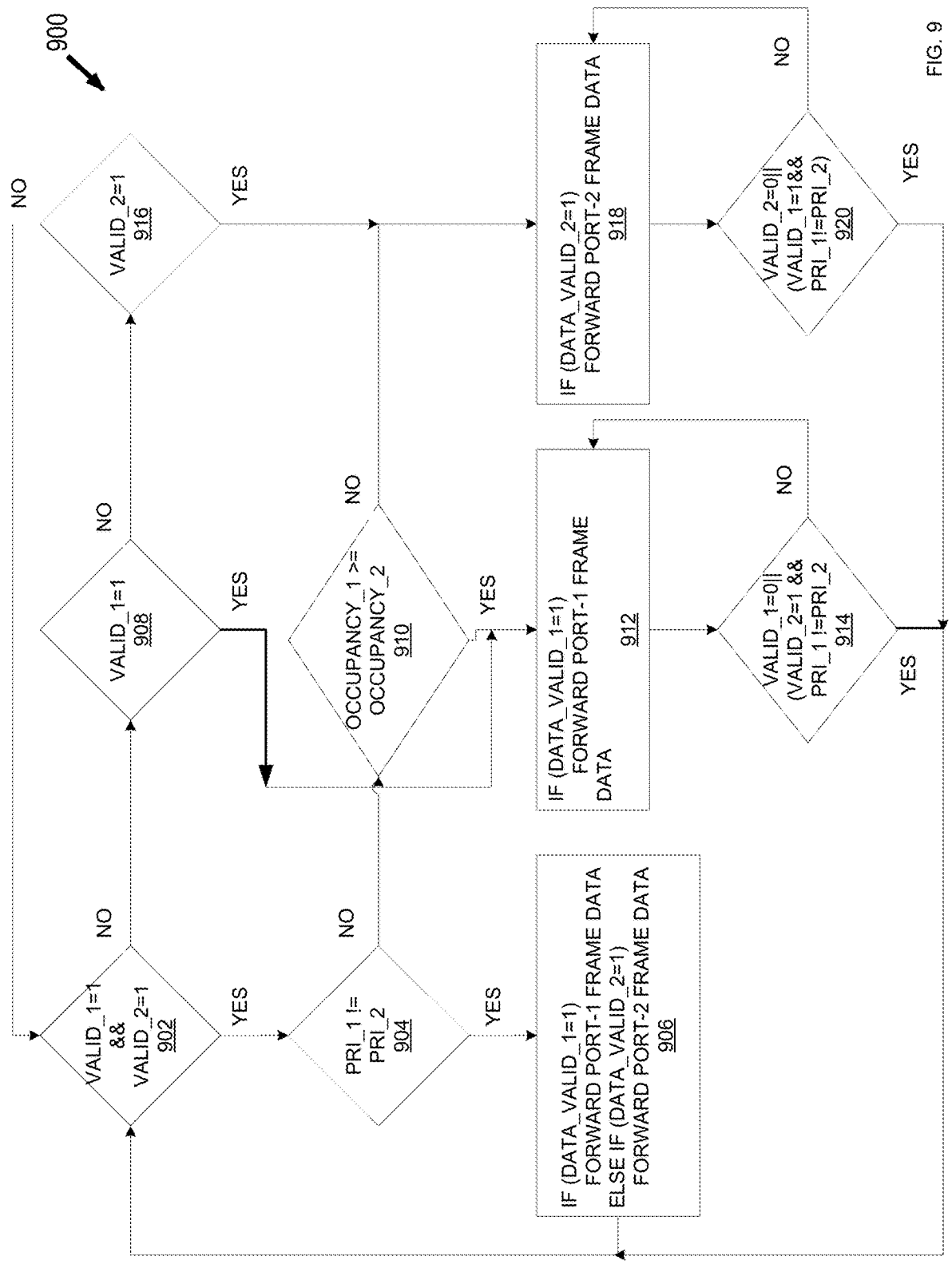
FIG. 9 is a flow chart illustrating an algorithm implementing the method for frame buffering and arbitration according to some embodiments of the present disclosure.

Referring to FIGS. 8A, 8B, and 9, a buffering and arbitration method using priority-based multiplexing and occupancy-based arbitration is described. Such a buffering and arbitration method may be performed by an arbitration engine 706 of the per egress port arbiter 700 of FIG. 7A.

As shown in FIG. 8A, the method 800 begins at block 802, where an arbitration engine 706 monitors buffers 702 and 704 of the input buffering system 705. In some embodiments, the arbitration engine 706 may receive a first frame from the buffer 702 and a second frame from the buffer 704 at the same time.

The method 800 proceeds to block 804, where the arbitration engine 706 determines whether both of the first frame from the buffer 702 and the second frame from the buffer 704 are valid.

In some embodiments, at block 804, the arbitration engine 706 determines that the first and second frames are not both valid. In such embodiments, the method 800 proceeds to block 806, where the arbitration engine 706 determines a forwarding frame based on the validity of the first and second frames by selecting the valid frame. The method 800 may then proceed to block 812 to forward data of the forwarding frame.

In some embodiments, at block 804, the arbitration engine 706 determines that both the first and second frames are valid. In such embodiments, the method 800 proceeds to block 808, where the arbitration engine 706 determines whether the first and second frames have the same priority.

In some embodiments, after the arbitration engine 706 determines that the first and second frames have the same priority at block 808, the method 800 proceeds to block 810, where the occupancy-based arbiter 710 of the arbitration engine 706 selects a frame from the first and second frames based on occupancies of the buffers 702 and 704. In an example where a first occupancy of the buffer 702 is equal to or greater than a second occupancy of the buffer 704, the occupancy-based arbiter 710 selects the first frame from the buffer 702 as the forwarding frame. In another example where a first occupancy of the buffer 702 is less than a second occupancy of the buffer 704, the occupancy-based arbiter 710 determines to forward the second frame from the buffer 704. In some embodiments, because the read rate from one or more of the buffers 702 and 704 is faster than the write rate to the corresponding buffer, one or more buffers 702 and 704 may under run. By using the occupancy-based arbiter 710, on detecting a buffer-under-run condition, the arbitration engine 706 may switch to the other input buffer for data forwarding. In various embodiments, such a forwarding frame decision by the occupancy-based arbiter 710 is taken only at frame boundaries (e.g., at start of frame (SOF) and/or end of frame (EOF) of the frames). In some embodiments, scheduled flows are timed such that they do not conflict on the network. In such embodiments, scheduled frames may not be received on both of the ingress ports simultaneously, and thus the occupancy-based arbiter 710 does not select a forwarding frame from two scheduled frames. The method 800 may then proceed to block 812 to forward data of the forwarding frame.

The method 800 may then proceed to block 814 to determine whether there is an interfere condition. The interfere condition may be detected when the arbitration engine 706 detects a valid frame from another ingress port having a different priority from the forwarding frame. In an example where at block 814 the arbitration engine 706 does not detect an interfere condition, the method 800 proceeds to block 812, and continues to forwarding data of the forwarding frame until that frame is completely forwarded. In another example where at block 814 the arbitration engine 706 detects an interfere condition, the method 800 proceeds to block 804 for determining the data to forward.

In some embodiments, after the arbitration engine 706 determines that the first and second frames have different priorities at block 808, the method 800 proceeds to block 816, where a multiplexer 708 of the arbitration engine 706 multiplexes the first and second frames at a data beat level to generate forwarding data including both the first and second frames. Referring to FIG. 8B, a multiplexer 708 receives, from the buffer 702, a first frame 850 including frame fragments 850-1 through 850-6. The multiplexer 708 receives, from the buffer 704, a second frame 852 including frame fragments 852-1 through 852-6. At block 812, the multiplexer 708 may multiplex (e.g., by performing a time-division multiplexing) the frames 850 and 852, and generates frame data 854 including frame fragments from the frames 850 and 852 in an alternating pattern. In the example of FIG. 8B, adjacent frame fragments (e.g., frame fragments 850-1 and 852-1) have different priorities. The method 800 may proceed to block 818, where the forwarding data (e.g., the forwarding data 854) are forwarded (e.g., in an order of frame fragments 850-1, 852-1, 850-2, 852-2, . . . , 850-6, 852-6) to buffers of the output buffering system 707 buffers based on the corresponding priority. In a particular example, the frame 850 has a priority of "0" and the frame 852 has a priority of "2." In that example, the frame fragments 850-1 through 850-6 of the frame data 854 are sent to buffer 712, and the frame fragments 852-1 through 852-6 of the frame data 854 are sent to buffer 716. The method 800 may then proceed to block 804 to perform arbitration for the subsequent frames.

Referring to FIG. 9, illustrated therein is an algorithm 900 implementing the method 800 for frame buffering and arbitration. The algorithm 900 uses variables VALID_1, VALID_2, PRI_1, PRI_2, DATA_VALID_1, DATA_VALID_2, OCCUPANCY_1, and OCCUPANCY_2 for performing the arbitration. The variable Valid_1 indicates the validity of a first frame received from a first ingress port. Such a validity of the frame may be unchanged for the entire frame duration of that frame. VALID_1 may be asserted to have a value of "1" to indicate a valid frame after receiving a start of frame (SOF) of the first frame, and may be asserted to have a value of "0" to indicate frame invalidity after receiving an end of frame (EOF) of the first frame. The priority associated with the frame may be applicable to that frame during the entire frame duration. There is a minimum one cycle arbitration turnaround period maintained between the SOF and EOF of the first frame. The variable VALID_2 indicates the validity of a second frame received from a second ingress port. VALID_2 may be asserted to have a value of "1" to indicate a valid frame after receiving a start of frame (SOF) of the second frame, and may be asserted to have a value of "0" to indicate frame invalidity after receiving an end of frame (EOF) of the second frame. There is a minimum one cycle arbitration turnaround period maintained between the SOF and EOF of the second frame. Variables OCCUPANCY_1 and OCCUPANCY_2 indicate the buffer occupancy of buffers for frames received from the first and second ingress ports respectively. For example, variable OCCUPANCY_1 measures the buffer occupancy of the buffer 702 for frames received from the first ingress port, and variable OCCUPANCY_2 measures the buffer occupancy of the buffer 704 for frames received from the second ingress port. Variables DATA_VALID_1 and DATA_VALID_2 indicate the next data beat data availability of the first frame from the first ingress port and the second frame from the second ingress port respectively. In some embodiments, an arbitration engine (e.g., an arbitration engine 706) works at a higher rate and reads the frame at the rate faster than the rate at which it is written to the associated ingress FIFO. In those embodiments, DATA_VALID_1 or DATA_VALID_2 for a frame received from an ingress port may be de-asserted (e.g., set the value to 0 to indicate unavailability) during that frame duration. PRI_1 and PRI_2 indicate the priorities associated with the first and second frames respectively.

The algorithm 900 begins at block 902, where an arbitration engine 706 monitors frames received from buffers 702 and 704, and determines whether there are valid first frame from the buffer 702 and second frame from the buffer 704.

In some embodiments, after determining that there are a valid first frame from the buffer 702 and a valid second frame from the buffer 704 at block 902, the algorithm 900 proceeds to block 904, where the arbitration engine 706 determines whether the first and second frames have different priorities.

In examples where at block 904, the arbitration engine 706 determines that the first and second frames have different priorities, the algorithm 900 may proceed to block 906. At block 906, the priority-based multiplexer 708 may multiplex the first and second frames to generate multiplexed data including frame fragments of the first and second frames in an alternating pattern. The arbitration engine 706 may then forward (e.g., to the buffers 712, 714, and 716) frame fragments of the multiplexed data to the output buffering system 707 based on the priority of each frame fragment.

In examples where at block 904, the arbitration engine 706 determines that the first and second frames have the same priority, the algorithm 900 may proceed to block 910 to perform occupancy-based arbitration. In other words, priority-based multiplexing may be disabled after the arbitration engine 706 determines that any subsequent frame received from other ingress ports matches the priority of the ongoing forwarding frame from a particular ingress port. At block 910, the occupancy-based arbiter 710 determines whether the first buffer (e.g., buffer 702) has a first occupancy (e.g., OCCUPANCY_1) that is equal to or greater than a second occupancy (e.g., OCCUPANCY_2) of the second buffer (e.g., buffer 704). In an example where the occupancy-based arbiter 710 determines that the first buffer (e.g., buffer 702) has a first occupancy that is equal to or greater than a second occupancy of the second buffer, the algorithm 900 proceeds to blocks 912 to forward the first frame data if the first frame data is valid (e.g., DATA_VALID_1 equals "1"). In other words, the multiplexing may be disabled after it is determined that any subsequent frame received from other ports matches the priority of the ongoing frame from a port.

The method may then proceed to block 914 to determine whether to continue forwarding the first frame data. In an example, at block 914, the arbitration engine 706 determines an interfere condition where the first frame is no longer valid (e.g., VALID_1 equals "0" indicating EOF) or that both the first and second frames are valid and have different priorities. In such an example, the algorithm 900 stops forwarding the first frame data and proceeds to block 902, and subsequently the arbitration engine 706 may decide to forward the second frame data (e.g., at block 918) or perform multiplexing (e.g., at block 906). In another example, at block 914, the arbitration engine 706 determines there is no interfere condition. In that example, the algorithm 900 proceeds to block 912 to continue forwarding the first frame data.

Similarly, as shown in blocks 910, 918, and 920, after the occupancy-based arbiter 710 determines that the first buffer (e.g., buffer 702) has a first occupancy less than a second occupancy of the second buffer (e.g., buffer 704), the occupancy-based arbiter 710 forwards the second frame data until an interfere condition is detected at block 920.

In some embodiments, at block 902, the arbitration engine 706 determines that it does not receive both a valid first frame from the buffer 702 and a valid second frame from the buffer 704. In those embodiments, the algorithm 900 may proceed to block 908 and 916 to determine the valid frame to forward, and then proceed to blocks 912 and 918 to forward that valid frame data to the output buffering system 707.

Referring to FIG. 10, a table 1000 illustrates the latency comparison of a first switch where its per egress port arbiter 616 implements the arbiter 700 of FIG. 7A (priority-based multiplexing and occupancy-based arbitration) and a second switch where its per egress port arbiter 616 implements the arbiter 730 of FIG. 7B (occupancy-based arbitration only). In the example of FIG. 10, each of the per egress port arbiters 618 and 620 for the network egress ports 206-E and 208E implements the arbiter 750 of FIG. 7C. The latency is measured from the first valid byte of a frame received on a network ingress port to the first valid byte of the same frame provided as output from the per egress port arbiter 616. In the example of FIG. 10, more than 1000 frames are sent simultaneously from network ports 206 and 208 to the internal endpoint port 204. The scheduled frames are provided (e.g., not simultaneously from two ingress ports) such that they do not interfere with each other. In an example shown in row 1002, the scheduled frames have a frame size of 64 bytes, and the best effort frames have a frame size of 2000 bytes. In that example, by using the priority-based multiplexing and occupancy-based arbitration, the maximum latency is reduced from 17,171 ns to 723 ns. As shown in the examples of rows 1002 through 1012, latencies for only occupancy-based arbitration may rely on the amount of occupancy of the input buffers, which may result in greater latency variations. By using both the priority-based multiplexing and occupancy-based arbitration, a latency variation between the minimum and maximum latencies is reduced. For example, a latency variation less than 100 ns under various frame size configurations is achieved, which may improve the time precision of a TSN system. As such, the buffering and arbitration method using both priority-based multiplexing and occupancy-based arbitration provides improved time precision and latency, resulting in a highly deterministic forwarding mechanism. This allows a fine control over endpoint listener components.

In some embodiments, a network may implement a frame preemption mechanism defined in IEEE 802.1Qbu. By using a frame preemption mechanism, lower priority frames may be fragmented to enable the transmission of higher priority frames. In those embodiments, it requires a minimum frame size of 124 bytes and that at least 64 bytes of data may be sent in the fragmented lower priority frames. This may result in jitter of as high as 1,088 ns. Further, in those embodiments, when the higher priority frames are received during an on-going lower priority frame transmission, the lower priority frame transmission is suspended by creating a frame fragment. After the higher priority frame is completely sent, the lower priority frame transmission is resumed with the next fragment of the lower priority frame. Such embodiments may not be efficient because a minimum granularity of 64-bytes of the frame fragment is required. Such embodiments further require frame tagging and a cyclic redundancy check (CRC) recalculation for all fragmented frames.

On the other hand, the buffering and arbitration system described in FIGS. 6 through 10 may multiplex both higher and lower priority frames at a granularity that may be as small as a byte. Such a buffering and arbitration system reduces latency for the higher priority frames, and reduces buffering needs and latency for lower priority frames. In an example, because the input buffering system 705 is drained at a faster rate, the latency of any subsequent priority frames received on any of the ingress port is also minimalistic. In some embodiments, the buffering and arbitration system described in FIGS. 6 through 10 may not be applicable on network interfaces where network interfaces are governed by a minimum Ethernet frame size requirement. In those embodiments, the buffering and arbitration system described in FIGS. 6 through 10 is not an alternative to IEEE 802.1Qbu for network interfaces. As such, that buffering and arbitration system may be implemented in the internal arbitration and reduced buffering mechanisms in the switch, but not implemented on the network interfaces of that switch.

It is noted that various configurations (e.g., the number of ports of the switch 202, the frame priorities) illustrated in FIGS. 2 through 10 are exemplary only and not intended to be limiting beyond what is specifically recited in the claims that follow. While examples for buffering and arbitrating frames to an internal endpoint port are used, a person skilled in the art will recognize that the buffering and arbitration method may be extended to forwarding frames to egress network ports for both reduced latencies and reduced buffering needs. In some embodiments, instead of maintaining per priority buffers for each ingress port, such a buffering and arbitration method allows for maintaining shared buffers for each ingress port in the input buffering system and per priority output buffering system for each egress port. Further, in such a buffering and arbitration method, the occupancy-based arbitration ensures that no backpressure is generated from the input buffering system, and the priority-based multiplexing ensures that the scheduled frames have a very low latency and a deterministic forwarding path.

One or more elements in embodiments of the invention may be may be implemented by software, hardware (e.g., an application specific integrated circuit (ASIC), a logic on a programmable logic IC (e.g., FPGA)), firmware, and/or a combination thereof. The embodiments may be implemented using various hardware resources, such as for example DSP slices, BRAM, and programmable resources of an FPGA; however, in other embodiments, digital signal processors, microprocessors, multi-core processors, memory, and/or other hardware may be used. When implemented in software, the elements of the embodiments of the invention are essentially the code segments to perform the necessary tasks. The program or code segments can be stored in a processor-readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read-only memory (ROM), a flash memory, an erasable programmable read-only memory (EPROM); a floppy diskette, a CD-ROM, an optical disk, a hard disk, or other storage device, The code segments may be downloaded via computer networks such as the Internet, Intranet, etc.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A network device, comprising:
a plurality of ports, wherein each port includes an ingress port and an egress port; and
an arbitration circuit including a plurality of per-egress port arbiters corresponding to the plurality of egress ports respectively,
   wherein each per-egress port arbiter is configured to perform a priority-based arbitration including:
   receiving a first frame and a second frame from one or more of the plurality of ingress ports;
   comparing a priority of the first frame and a priority of the second frame to generate a first comparison result;
   in response to the first comparison result, generating first forwarding data based on the first and second frames;
   wherein an internal endpoint egress port arbiter of the plurality of per-egress port arbiters corresponds to an internal endpoint egress port connecting to an internal endpoint through an internal bus of the network device, and
   wherein a network egress port arbiter of the plurality of per-egress port arbiters corresponds to a network egress port connecting to an external network through a network interface;
   wherein in response to a determination that a selected per-egress port arbiter is the network egress port arbiter, the selected per-egress port arbiter is configured to perform arbitration based on a per frame basis;
   wherein in response to a determination that a selected per-egress port arbiter is the internal endpoint egress port arbiter, the selected per-egress port arbiter is configured to perform arbitration different from the arbitration based on a per frame basis; and
   wherein the arbitration circuit is configured to send, to an output of the arbitration circuit, the first forwarding data.

2. The network device of claim 1, wherein each per-egress port arbiter of the arbitration circuit includes:
a multiplexer circuit configured to:
   in response to the first comparison result that the priority of the first frame is different from the priority of the second frame, generate the first forwarding data by multiplexing the first frame and the second frame.

3. The network device of claim 1, wherein
the internal endpoint egress port arbiter is configured to perform arbitration based on a data beat period.

4. The network device of claim 1, further comprising:
a first buffering system including:
   a first ingress buffer configured to receive, from a first ingress port, the first frame; and
   a second ingress buffer configured to receive, from a second ingress port, the second frame;
wherein the arbitration circuit receives the first and second frames from the first buffering system.

5. The network device of claim 4, wherein only the internal endpoint egress port arbiter of the internal endpoint egress port arbiter and network egress port arbiter of the arbitration circuit includes: an occupancy-based arbitration circuit configured to:
   in response to the first comparison result that the priority of the first frame is the same as the second priority of the second frame, generate the first forwarding data based on a first occupancy of the first ingress buffer and a second occupancy of the second ingress buffer.

6. The network device of claim 5, wherein to generate the first forwarding data based on the first and second occupancies, the occupancy-based arbitration circuit is configured to:
   determine that the first occupancy is greater than the second occupancy; and
   generate the first forwarding data based only on the first frame.

7. The network device of claim 4, wherein the first ingress buffer includes a cut through buffer.

8. The network device of claim 4, wherein the first ingress buffer is configured to:
   receive, from the first ingress port, a third frame having a priority different from the priority of the first frame.

9. The network device of claim 4, further comprising a second buffering system configured to:
   receive, from the internal endpoint egress port arbiter of the arbitration circuit, the first forwarding data; and
   forward, to the internal endpoint egress port, second forwarding data including the first forwarding data;
   wherein the network egress port arbiter is configured to forward the first forwarding data to a time aware scheduler.

10. The network device of claim 9, wherein the second buffering system includes a store and forward buffer.

11. A method, comprising:
receiving, from one or more of a plurality of ingress ports of a plurality ports of a network device, a first frame and a second frame;
determining a selected per-egress port arbiter from a plurality of per-egress port arbiters based on an egress port corresponding to the first and second frames, the plurality of per-egress port arbiters including:
   an internal endpoint egress port arbiter corresponding to an internal endpoint egress port connecting to an internal endpoint through an internal bus of the network device; and
   a network egress port arbiter corresponding to a network egress port connecting to an external network through a network interface;
wherein in response to a determination that the selected per-egress port arbiter is the network egress port arbiter, the selected per-egress port arbiter is configured to perform arbitration based on a per frame basis;
wherein in response to a determination that the selected per-egress port arbiter is the internal endpoint egress port arbiter, the selected per-egress port arbiter is configured to perform arbitration different from the arbitration based on a per frame basis;

performing, by the selected per-egress port arbiter, priority-based arbitration including:

comparing a priority of the first frame and a priority of the second frame to generate a first comparison result;

in response to the first comparison result, generating first forwarding data based on the first and second frames; and forwarding the first forwarding data.

12. The method of claim 11, wherein the generating the first forwarding data based on the first and second frames includes:

in response to the first comparison result that the priority of the first frame is different from the priority of the second frame, generating the first forwarding data by multiplexing the first frame and the second frame.

13. The method of claim 12, wherein the internal endpoint egress port arbiter is configured to perform arbitration based on a data beat period.

14. The method of claim 11, further comprising:

receiving, by a first ingress buffer of a first buffering system from a first ingress port, the first frame; and receiving, by a second ingress buffer of the first buffering system from a second ingress port, the second frame.

15. The method of claim 14, further comprising:

in response to a determination that the selected per-egress port arbiter is the internal endpoint egress port arbiter, in response to the first comparison result that the priority of the first frame is the same as the priority of the second frame, generating the first forwarding data based on a first occupancy of the first ingress buffer and a second occupancy of the second ingress buffer.

16. The method of claim 15, wherein the generating the first forwarding data based on the first and second occupancies includes:

determining that the first occupancy is greater than the second occupancy; and generating the first forwarding data based only on the first frame.

17. The method of claim 14, wherein the first ingress buffer includes a cut through buffer.

18. The method of claim 14, further comprising:

receiving, by the first ingress buffer from the first ingress port, a third frame having a priority different from the priority of the first frame.

19. The method of claim 14, further comprising:

receiving, by a second buffering system coupled to the internal endpoint egress port arbiter, the first forwarding data; and forwarding, by the second buffering system to the internal endpoint egress port, second forwarding data including the first forwarding data.

20. The method of claim 19, wherein the second buffering system includes a store and forward buffer.

* * * * *